(12) United States Patent
Wu et al.

(10) Patent No.: US 7,852,257 B2
(45) Date of Patent: Dec. 14, 2010

(54) ANTI-INTERFERENCE MICROWAVE MOTION SENSOR

(75) Inventors: Xiaodong Wu, Roseville, CA (US); Leslie K. Green, Applegate, CA (US); James N. Helland, Agoura Hills, CA (US)

(73) Assignee: Honeywell International Inc., Morristown, NJ (US)

( * ) Notice: Subject to any disclaimer, the term of this patent is extended or adjusted under 35 U.S.C. 154(b) by 311 days.

(21) Appl. No.: 11/961,480

(22) Filed: Dec. 20, 2007

(65) Prior Publication Data

US 2009/0160698 A1 Jun. 25, 2009

(51) Int. Cl.
*G01S 13/00* (2006.01)
(52) U.S. Cl. ............... 342/28; 342/27; 342/134
(58) Field of Classification Search .......... 342/28
See application file for complete search history.

(56) References Cited

U.S. PATENT DOCUMENTS

| | | | | |
|---|---|---|---|---|
| 4,310,842 A | * | 1/1982 | Siebeneck et al. | 342/28 |
| 4,768,035 A | * | 8/1988 | Thurber et al. | 342/194 |
| 5,287,111 A | * | 2/1994 | Shpater | 342/28 |
| 6,127,926 A | * | 10/2000 | Dando | 340/541 |
| 6,218,979 B1 | * | 4/2001 | Barnes et al. | 342/28 |
| 6,420,995 B1 | * | 7/2002 | Richmond et al. | 342/45 |
| 6,456,231 B1 | * | 9/2002 | McEwan | 342/93 |
| 2004/0178952 A1 | * | 9/2004 | Jenkins | 342/202 |
| 2004/0189513 A1 | * | 9/2004 | Shono | 342/70 |
| 2005/0275584 A1 | * | 12/2005 | Hager et al. | 342/120 |
| 2006/0128503 A1 | * | 6/2006 | Savarese et al. | 473/353 |
| 2007/0216567 A1 | * | 9/2007 | Ikeda | 342/92 |

FOREIGN PATENT DOCUMENTS

WO WO 2006035199 A1 * 4/2006

* cited by examiner

*Primary Examiner*—Thomas H Tarcza
*Assistant Examiner*—Timothy A Brainard
(74) *Attorney, Agent, or Firm*—Husch Blackwell Welsh Katz

(57) ABSTRACT

A microwave motion sensor for protecting an area comprises an oscillator configured to generate a plurality of microwave signals, a random pulse generator configured to set a random pulse period for each transmitted microwave signal, an antenna configured to transmit the microwave signals and to receive reflected signals, and a signal processor coupled to the antenna through other circuitry, said signal processor is configured to process the reflected signals to determine a presence of a moving object in the protected area.

19 Claims, 3 Drawing Sheets

ANTI-INTERFERENCE MICROWAVE MOTION SENSOR

BACKGROUND

1. Field of Invention

This invention relates generally to microwave motion sensors and more particularly to microwave sensors implemented using a random pulse generator.

2. Description of Related Art

Typically, microwave sensors are used to detect the presence of moving objects, indicating an intrusion, in an area by sending microwaves to a region that is to be monitored. The microwave sensor transmits a microwave signal toward a region and in the event that movement is detected, the microwave signal is reflected back (echo). The reflected signal is modulated due to the Doppler Effect and is shifted in frequency. The frequency shift is directly proportional to the object's velocity relative to the sensor. Typically, a maximum frequency shift occurs when the target is moving straight towards the sensor and a minimum frequency shift is observed when the object is moving at 90 degrees to the object.

Currently microwave motion sensors are operated with fixed pulse periods. If two sensors are the same kind and are in close proximity to each other, they will eventually interfere with each other, in that the pulse width of each sensor will overlap each other. The overlap may occur due to component tolerances. The resultant overlapped pulse width may cause the microwave sensors to become noisy and create false alarms. Such a condition typically occurs when two or more sensors are installed too close to each other, installed facing each other and when the microwave frequency of the sensors are the same or close to each other.

One method by which the above-mentioned problem can be overcome is to set the sensors at different microwave frequencies. This requires the installer to carry many sensors at different frequencies. However, this practice increases the cost of operation for both manufacturer and the customer, and is not desirable.

Therefore, what is needed is a robust, reliable and cost effective microwave sensor that can be configured to prevent the pulse width from overlapping when the sensors are installed facing each other or close to each other, even if they are set at the same frequency.

SUMMARY OF THE INVENTION

According to one exemplary embodiment of the invention, a microwave sensor is provided. Although the sensor operates independently of other sensors this invention takes care of the problem when two or more sensors operate within close proximity of each other. The microwave sensor comprises an oscillator configured to generate a microwave signal, a random pulse generator configured to set a random pulse period for each transmitted microwave signal, an antenna configured to transmit the microwave signal for a corresponding pulse period and to receive reflected signals, and a signal processor coupled to the antenna through a signal conditioning circuitry and mixer. The signal processor is configured to process the reflected signals to determine a presence of a moving object. The microwave sensor includes in the signal conditioning circuitry a sample and hold circuit, amplifiers and filters for conditioning the signal before it is processed.

In another embodiment, a method for detecting a presence of a moving object comprises generating a plurality of microwave signals, randomly setting a respective pulse period for each corresponding transmitted microwave signal; transmitting the plurality of microwave signals for a corresponding pulse period, receiving a plurality of reflected signals and processing the reflected signals to determine the presence of a moving object.

In another embodiment, a security device for detecting a presence of a moving object or an intruder in a detection area is provided. The security device comprises two or more microwave sensors located in the detection area in close proximity to each other, or facing each other. Each microwave sensor comprises an oscillator configured to generate a plurality of microwave signals, a random pulse generator configured to set a respective pulse period for a corresponding transmitted microwave signal, an antenna configured to transmit the plurality of microwave signals for a corresponding pulse period and to receive reflected signals and a signal processor coupled to the antenna through other circuits. and configured to process the reflected signals to determine the presence of a moving object.

BRIEF DESCRIPTION OF THE DRAWINGS

These and other features, benefits and advantages of the present invention will become apparent by reference to the following text figures, with like reference numbers referring to like structures across the views, wherein.

DETAILED DESCRIPTION

As used herein, "adapted to", "configured" and the like refer to mechanical or structural connections between elements to allow the elements to cooperate to provide a described effect; these terms also refer to operation capabilities of electrical elements such as analog or digital computers or application specific devices (such as an application specific integrated circuit (ASIC)) that are programmed to perform a sequel to provide an output in response to given input signals.

Figure 1:
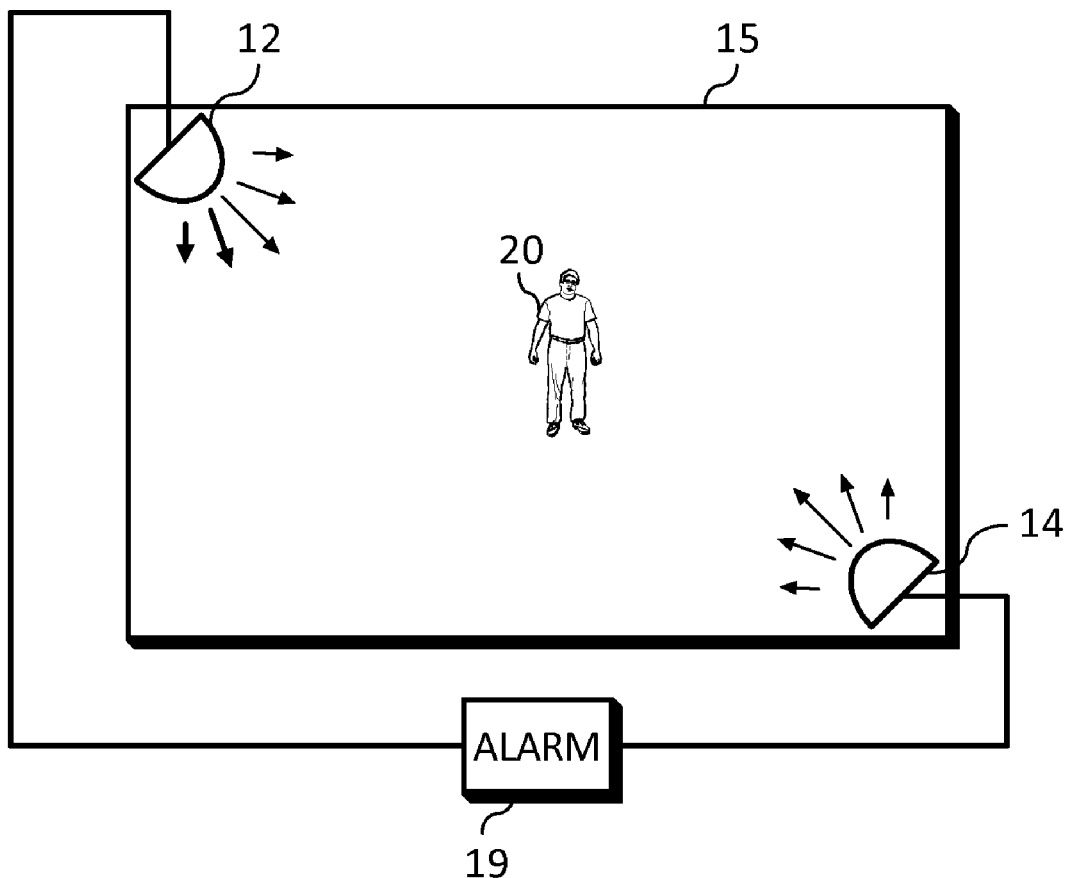
FIG. 1 is a block diagram of an embodiment of a security system implemented according to one aspect of the present invention.

FIG. 1 is a block diagram of an embodiment of a security system 10 implemented using microwave sensors according to one aspect of the present invention. The security system 10 is shown by way of example only. The security system 10 implementing the microwave sensors is described in further detail below. Although FIG. 1 only shows two microwave sensors in close proximity to each other, it may be understood that this invention may be employed with more than two sensors.

The security system 10 comprises microwave sensors 12 and 14 respectively. The security system 10 is configured to detect the presence of a moving object. 20 within a detection area (or secured area) 15 by detecting motion. In the illustrated embodiment, the microwave sensor 12 is disposed facing the microwave sensor 14. As used herein, 'face each other' refers to an arrangement where a transmitting region of a microwave sensor is in front of a transmitting region of another microwave sensor. It is noted here that in the conventional sensor systems, if the distance between the sensors is not large enough, sensors facing each other interfere with each other. The present invention also applies to the situation when sensors 12 and 14 are disposed adjacent to each other, for example, if both are attached to the same pole.

Microwave sensors are further adapted to receive the reflected signals that are reflected by the object 20. The characteristics of the reflected signals are analyzed to determine if there has been a security breech in the detection area 15. Upon detection of motion of an object by one or more of the microwave sensors 12 and 14, an alarm 19 is activated.

Figure 2:
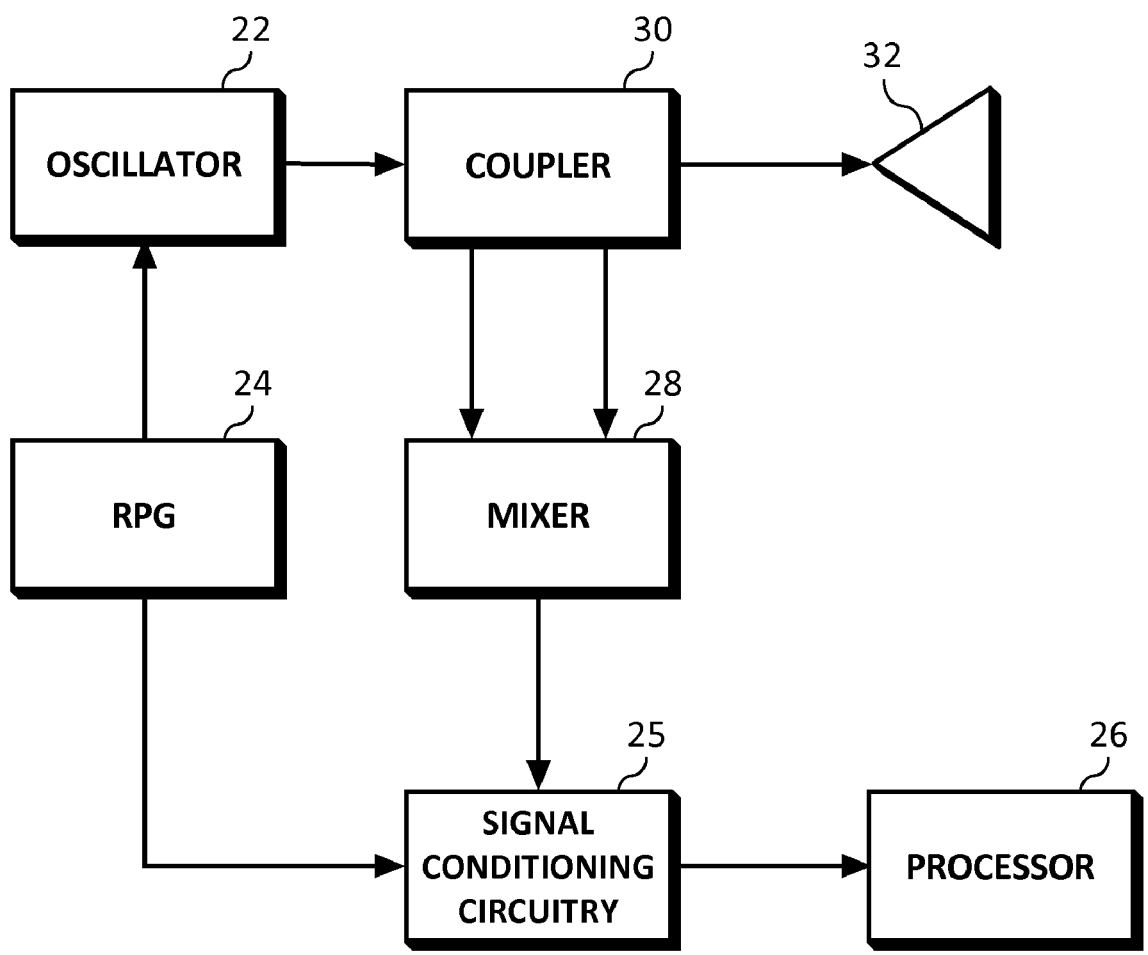
FIG. 2 is a block diagram of an embodiment of a microwave sensor implemented according to one aspect of the present invention.

FIG. 2 is a block diagram of an embodiment of a microwave sensor 12 implemented according to one aspect of the present invention. The microwave sensor 12 comprises an oscillator 22, a random pulse generator 24, a signal conditioning circuitry 25, a signal processor 26, a mixer 28, a coupler 30 and an antenna 32. The random pulse generator 24 and the signal processor 26 may be part of a microcontroller, DSP chip or ASIC. Each component is described in further detail below.

The oscillator 22 is configured to generate a plurality of pulsed microwave signals at a pre-determined frequency. The signals generated by the oscillator 22 are transmitted into a detection area 10 using the antenna 32.

The random pulse generator (RPG) 24 is connected to the oscillator 22 and is configured to set a random pulse period for each transmitted microwave signal. Thus, the pulse period for each transmitted microwave signal changes randomly. The RPG 24 is further configured to synchronize the transmitter and the sample and hold circuit (not shown) in the signal conditioning circuitry 25 by sending a gating signal to the signal conditioning circuitry 25.

The antenna 32 is also configured to receive any reflected signals from an object 20 in the detected or secured area 15. The mixer 28 is connected to the coupler 30 and receives the signal from the oscillator 22 and also the reflected signal from the antenna 32. The mixed signal is transmitted to the signal conditioning circuitry 25 where it is sampled, amplified and filtered. The signal conditioning circuitry 25 receives a control voltage from the RPG 24 that generates a signal when the conditioning circuitry is to be activated.

The signal processor 26 receives the signal from the signal conditioning circuitry 25 and processes it to determine if there is motion indicative of intrusion in the detection area. If intrusion is indicated, the signal processor 26 generates an alarm.

The microwave sensors are configured to operate with variable pulse period, which is randomly set. The manner in which the microwave sensor operates is described in further detail below with reference to FIG. 3.

Figure 3:
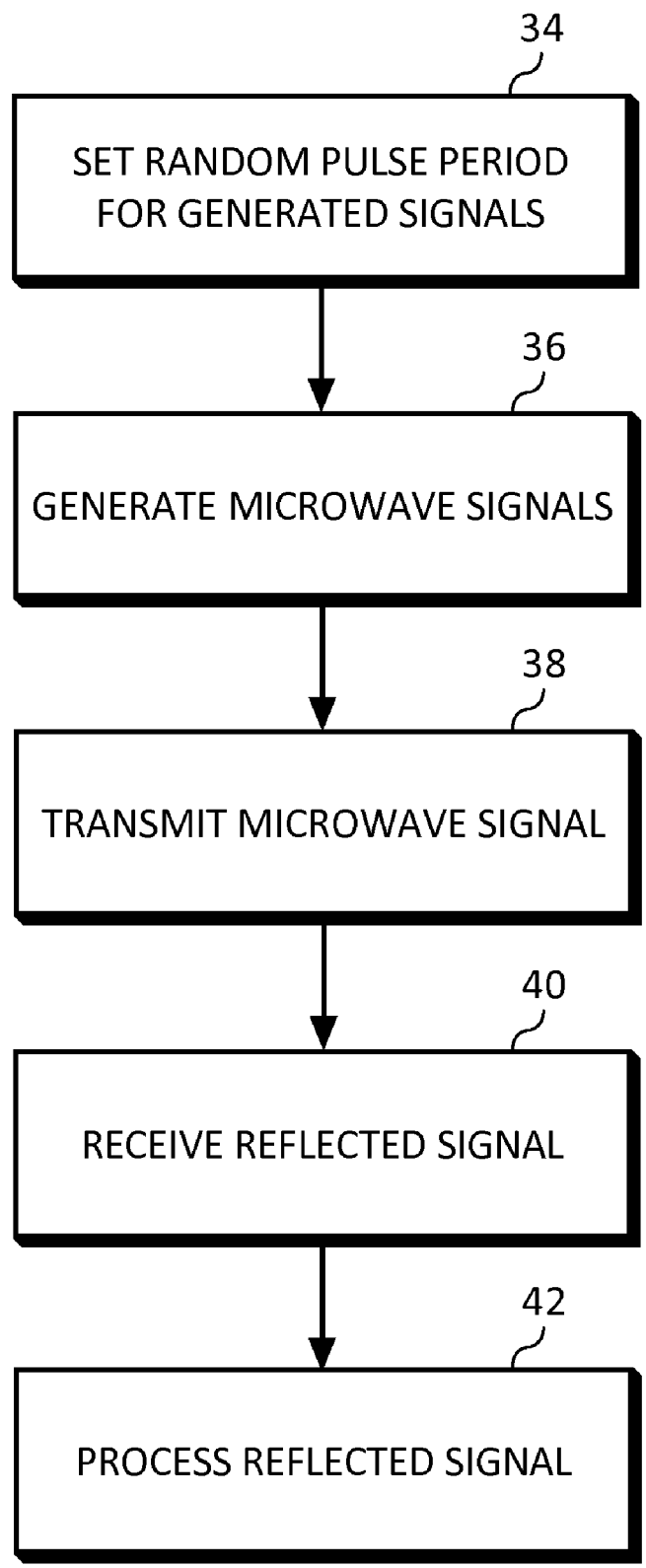
FIG. 3 is a flow chart illustrating one method for detecting the presence of a moving object. according to one aspect of the present invention.

FIG. 3 is a flow chart illustrating one method for detecting the presence of a moving object. according to one aspect of the present invention. Each step is described in further detail below.

At step 34, the random pulse period is generated which is used to drive the microwave signal generator.

At step 36, each transmitted microwave signal is set with a respective pulse period. In one embodiment, the pulse period is set using a random pulse generator.

At step 38, the microwave signals are transmitted using an antenna. In the presence of a moving object on the transmitted path of the microwave signal, a portion of the microwave signal is reflected back towards its source.

At step 40, the reflected signals are received by an antenna. In one embodiment, the receive antenna and the transmit antenna are the same In a further embodiment, the receive antenna and the transmit antenna are separate antennas.

At step 42, the reflected signals are processed to determine a presence of a moving object in the detection area. In one embodiment, the reflected signals are mixed with the transmitted microwave signals to generate a mixed signal. In a further embodiment, the method includes applying a gating signal by the random pulse generator to control the conditioning of the mixed signal.

The above-described invention has several advantages including substantially lowered interference even when the microwave sensors are located in close proximity to each other or when installed facing each other. By using a random pulse period for each transmitted signal, the issue of overlapping pulse widths is minimized even when the transmitting microwave frequency is the same. The system therefore is more reliable as the occurrence of false alarms is considerably reduced.

While there has been shown and described what is considered to be preferred embodiments of the invention, it will, of course, be understood that various modifications and changes in form or detail could readily be made without departing from the spirit of the invention. It is therefore intended that the scope of the invention not be limited to the exact forms described and illustrated, but should be construed to cover all modifications that may fall within the scope of the appended claims.

What is claimed is:

1. A microwave motion sensor system comprising:
a plurality of microwave sensors, each operating on the same microwave frequency, each transmitting a microwave signal and receiving a reflected portion of the transmitted microwave signal, the plurality of microwave sensors located in the detection area in close proximity to each other or facing each other and where each microwave sensor of the plurality of microwave sensors further comprises:
an oscillator configured to generate a plurality of pulsed microwave signals;
a random pulse generator configured to set a random pulse period for the generated microwave signals where the pulse period of the microwave signals set by the random pulse generator changes randomly;
an antenna configured to transmit the microwave signals with the randomly changing pulse period and to receive reflected signals; and
a signal processor coupled to the antenna and the random pulse generator and configured to process the reflected signals to determine a presence of a moving object in a protected area.

2. The microwave sensor of claim 1, further comprising a mixer coupled to the antenna and the oscillator and configured to mix the reflected signals received from the antenna with the microwave signals from the oscillator to generate corresponding mixed signals.

3. The microwave sensor of claim 2, wherein the signal processor is configured to process the mixed signal to determine the presence of a moving object in the protected area.

4. The microwave sensor of claim 1, further comprising a coupler configured to couple the antenna to the oscillator and the mixer.

5. The microwave sensor of claim 1, wherein the signal processor is further configured to generate an alarm based on the presence of a moving object in a protected area.

6. The microwave sensor of claim 1, further comprising a signal conditioning circuitry coupled to the mixer and the signal processor and configured to condition the mixed signal.

7. The microwave sensor of claim 6, wherein the signal conditioning circuitry is configured to receive a gating signal from the random pulse generator.

8. A security system for detecting a presence of a moving object in a protected area, the security system comprising:
- at least two microwave sensors located in the protected area, each transmitting a microwave signal and receiving a reflected portion of the transmitted microwave signal and where each operate on the same microwave frequency, the microwave sensors being positioned so that there is interference between signals generated by the two or more of the sensors; each microwave sensor comprising:
- an oscillator configured to generate a plurality of microwave signals;
- a random pulse generator configured to set a random pulse period for each transmitted microwave signal where the pulse period of the microwave signals set by the random pulse generator changes randomly and to provide a gating signal to a signal conditioning circuitry;
- an antenna configured to transmit the microwave signals with the randomly changing pulse period and to receive reflected signals; and
- a signal processor coupled to the antenna and the random pulse generator and configured to process the reflected signals to determine a presence of a moving object in the protected area.

9. The security system of claim 8, wherein each microwave sensor further comprises a mixer coupled to the antenna and the oscillator and configured to mix the reflected signals with the microwave signals to generate corresponding mixed signals.

10. The security system of claim 8, wherein the microwave sensor further comprises a coupler configured to couple the antenna to the oscillator and the mixer.

11. The security system of claim 8, further comprising a signal conditioning circuitry coupled to the mixer and the signal processor and configured to receive a gating signal from the random pulse generator.

12. The security system of claim 8, further comprising an alarm coupled to each microwave sensor, wherein the microwave sensor is configured to trigger the alarm based on the presence of a moving object in the protected area.

13. The security system of claim 8, wherein at least two microwave sensors are positioned adjacent to each other.

14. The security system of claim 8, wherein at least two microwave sensors are positioned facing each other.

15. A method for detecting a presence of a moving object in a protected area, the method comprising:
- providing a plurality of microwave sensors in the protected area, each operating on the same microwave frequency, each transmitting a microwave signal and receiving a reflected portion of the transmitted microwave signal, the plurality of microwave sensors located in the protected area in close proximity to each other or facing each other;
- each of the plurality of microwave sensors generating a plurality of microwave signals;
- each of the plurality of microwave sensors setting a random pulse period for each transmitted microwave signal where the pulse period of the microwave signals set by the random pulse generator changes randomly;
- each of the plurality of microwave sensors transmitting the plurality of microwave signals with the randomly changing pulse period;
- each of the plurality of microwave sensors receiving a plurality of reflected signals; and
- each of the plurality of microwave sensors processing the reflected signals to determine a moving object is in the protected area.

16. The method of claim 15, further comprising mixing the reflected signals with a generated microwave signal to generate a corresponding mixed signal, and processing the mixed signal to determine a presence of the moving object in the protected area.

17. The method of claim 16, further comprising conditioning the mixed signal prior to the processing step.

18. The method of claim 17, wherein the random pulse period is set by a random pulse generator, the random pulse generator applying a gating signal for controlling the conditioning of the mixed signal.

19. The method of claim 15, further comprising generating an alarm based on a presence of a moving object in the protected area.

* * * * *